Feb. 4, 1947.  W. HOLMAN ET AL  2,415,284

BATTERY HOLD-DOWN DEVICE

Filed May 22, 1944

INVENTORS
WILLIAM HOLMAN
GUSTAVE HOLMAN
BY
Wheeler, Wheeler & Wheeler
ATTORNEYS.

Patented Feb. 4, 1947

2,415,284

UNITED STATES PATENT OFFICE 2,415,284

BATTERY HOLD-DOWN DEVICE

William Holman and Gustave Holman, Sheboygan, Wis.

Application May 22, 1944, Serial No. 536,736

1 Claim. (Cl. 180—68.5)

This invention relates to improvements in battery holddown devices.

Automobile batteries are mounted on supports to which they are conveniently held by some sort of a frame or holddown applied to the top of the battery and held to the support by bolts. Since the holddown frame is so located as to be particularly subject to corrosion, it frequently requires replacement. In order that the dealer may be able with a single frame to fit all of the various sizes of batteries, it has become the practice to supply holddown frames which are adjustable, at least as to length, the width being more or less standardized.

It is a primary object of the present invention to provide an adjustable holddown frame in which the legs which are longitudinally adjustable along each other are always connected at their extreme ends so that, in every adjustment, the frame will have maximum strength as compared with the situation which exists when the connection between the adjustable legs is effected only at the center of the frame.

In order that the legs may be slidably connected at their extreme ends, it is a further object of the invention to provide a novel and improved bolt anchor so designed that it may be positioned adjustably upon the frame and may be rendered effective in operative relation to the bolt, substantially regardless of the particular adjustment of the frame required in any particular instance.

Other objects of the invention will be apparent to those skilled in the art upon the examination of the following disclosure.

In the drawing.

Like parts are identified by the same reference characters throughout the several views.

Figure 1:
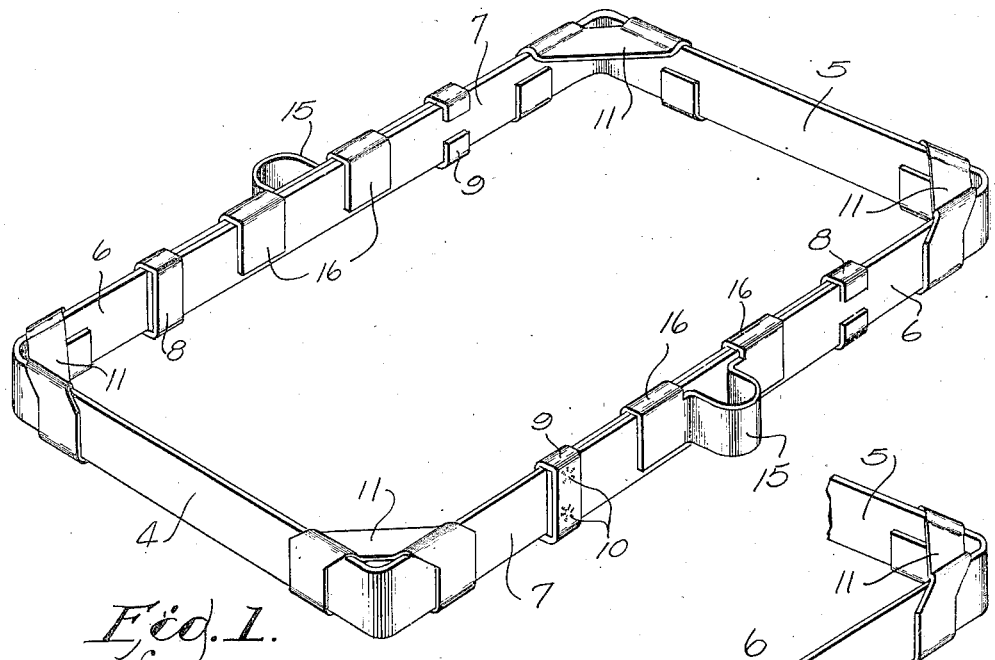
Figure 1 is a view in perspective of the completed holddown device embodying the invention.

The holddown frame is of generally rectangular form in order to be complementary to the size and shape of the conventional battery. It may conveniently comprise two U-shaped parts each including an end 4, 5 and two legs 6, 7. When the component parts are assembled, as shown in Figure 1, the respective legs 6 of the component parts slide along the legs 7 of the opposing parts. To fit the ordinary battery, the legs will ordinarily overlap approximately to the extent indicated in Figure 1.

A slidable connection between the legs is effected by means of the clips 8, 9. As illustrated by the clip 9, spot welding at 10 may be used to connect the clip to the extreme end of the leg 6 with which it is associated. The clip includes fingers which extend about the other leg to provide a sliding connection between the legs. The clip 8 may be similarly spot welded to the extreme end of the leg 7 or, to facilitate assembly, it may be left free and may be manually adjusted to engage the end portion of the leg 7.

In any event, it will be noted from Fig. 1 that by reason of the location of the respective clips 8 and 9 at the extreme ends of the respective legs, the frame or holddown has a maximum of strength to resist deformation under tension of the bolts whereby the holddown is clamped against the battery.

The corners of the frame are preferably cross-connected by diagonal bracing at 11 applied in accordance with the disclosure of our copending application No. 511,640, filed November 24, 1943, and entitled Frame corner structure.

Figure 2:
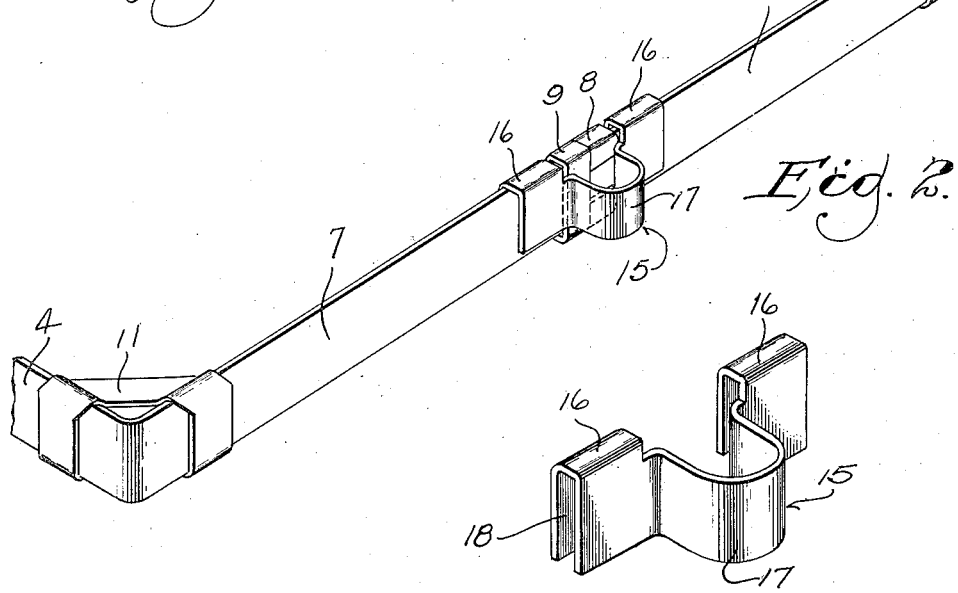
Figure 2 is a fragmentary detailed view showing one side of the device expanded to its utmost range.

When the frame is expanded to its utmost, as shown in Fig. 2, the clips 9 and 8 will be in direct engagement. The overlap between the legs will then be at a minimum, as will the strength of the frame. However, in all positions of the frame, the clip locations assure the maximum strength possible for that position.

Figure 3:
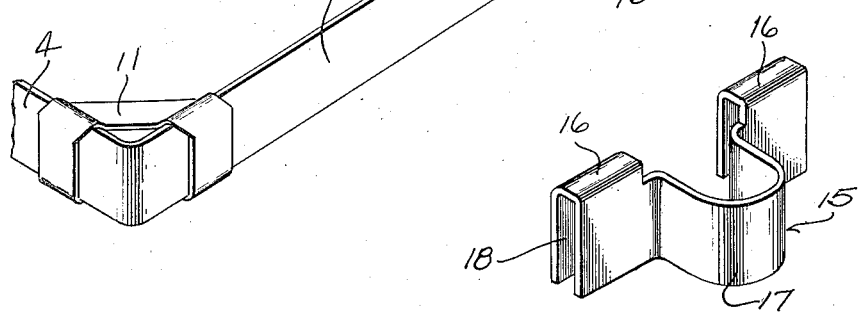
Figure 3 is an enlarged detailed view in perspective showing the improved bolt anchor of our invention.

The bolt anchors 15 are of a construction separately illustrated in Fig. 3. They are adjustable along the frame to register with any conceivable location of the bolts either at the sides or the ends of the battery. They comprise in one integral stamping two flat hooks 16 and a connecting eye 17 through which the anchor bolt extends. A washer on the bolt will engage the top of the eye and the tension exerted by the bolt will be transmitted through the hooks 16 to the frame over which the hooks will be engaged in use.

The channel 18 through each hook will be sufficiently wide to accommodate the appropriate portion of the frame. It will not ordinarily be necessary to make this channel sufficiently wide to accommodate the clips, as it is practically invariably possible, regardless of the clip locations, to so position the anchor device 15 that the bolt may be engaged therewith. The channels 18 will, however, ordinarily be at least wide enough to accommodate the combined thickness of two lapping legs 6 and 7 of the frame, as shown in Fig. 1. In the normal adjustment of the frame, the hooks 16 will not be so widely spaced that they cannot be engaged with the frame between the clips 8 and 9. On the other hand, when the frame is fully extended, as shown in Fig. 2, the hooks may be spaced sufficiently far apart to receive both of the clips 8 and 9, or at least one of them, between the hooks. Thereupon the lefthand hook illustrated in Fig. 2 will be engaged only with leg 7, while the righthand hook will be engaged only with leg 6. The arrangement permits sufficient adjustment to accommodate all possible conditions in the field, while providing an exceptional degree of strength for an adjustable frame. The spot welding at 10 may be omitted, if desired, so that either both or neither of the clips may be permanently positioned with respect to the end of the frame leg with which it is associated. It is preferred that at least one of the two clips at each side of the frame shall be permanently so secured.

We claim:

A battery holddown frame comprising a pair of oppositely disposed U-shaped frame elements, each comprising a frame end and side legs, with the legs on each side in sliding contact with each other for adjustment of the length of the frame, flat connecting clips, each rigidly secured to the end portion of one of the legs and loosely embracing a portion of the associated leg of the other element, said clips being adapted to serve as stops contacting with each other to limit the separation of the frame ends, whereby each pair of associated legs is connected by a pair of clips as widely spaced as the adjustment of the frame elements will permit, and bolt anchors at the respective sides of the frame, each comprising a pair of inverted U-shaped members of rectangular cross section each loosely embracing one pair of associated legs and an intermediate connecting bolt receiving loop, with the inverted U-shaped members of each pair sufficiently spaced from each other to receive both of said connecting clips between them when the frame is wholly extended.

WILLIAM HOLMAN.
GUSTAVE HOLMAN.

REFERENCES CITED

The following references are of record in the file of this patent:

UNITED STATES PATENTS

| Number | Name | Date |
|---|---|---|
| 1,469,595 | Hick | Oct. 2, 1923 |
| 2,216,663 | Fogle | Oct. 1, 1940 |
| 2,257,155 | Bowers | Sept. 30, 1941 |
| 2,326,481 | Meyer | Aug. 10, 1943 |